Oct. 4, 1949.  W. F. KLEMM  2,483,495
HARDNESS TESTER
Filed April 14, 1945
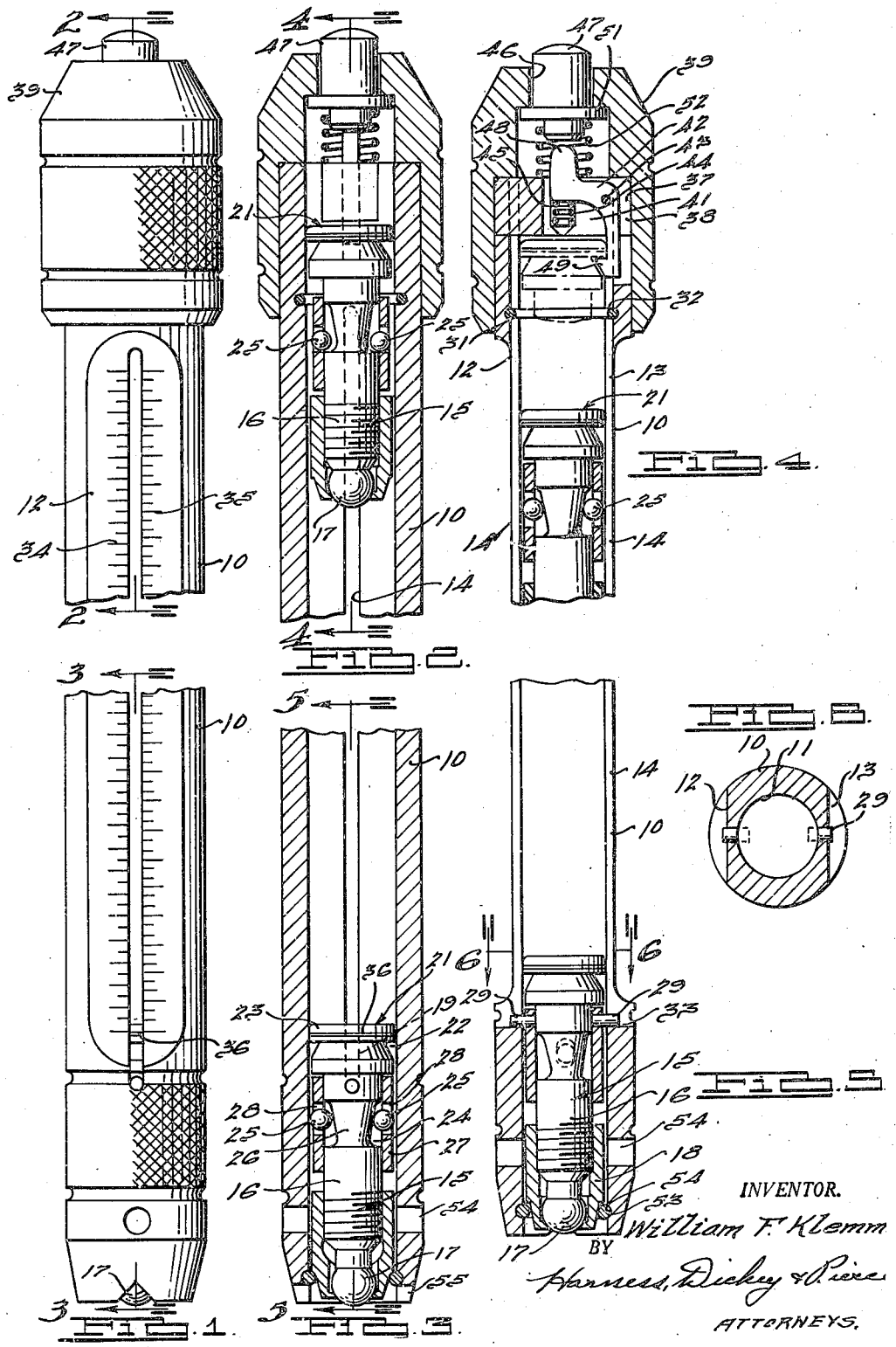

Patented Oct. 4, 1949

2,483,495

UNITED STATES PATENT OFFICE 2,483,495

HARDNESS TESTER

William F. Klemm, Detroit, Mich.

Application April 14, 1945, Serial No. 588,295

5 Claims. (Cl. 73—79)

This invention relates to hardness testing devices, and particularly to a portable testing device for checking the hardness of a material to an appreciable depth as well as of the skin surface thereof.

Various devices known in the art, such as the Scleroscope, the Rockwell, and the Brinell testing devices, have been employed for testing the hardness of metals, the reading of which provides a comparison with each other and known standards of hardness. The Scleroscope employs a means for dropping an element from a predetermined height and visually noting the maximum height that the element has rebounded. The Brinell testing device applies a predetermined static weight to a ball of predetermined diameter for sinking the ball into the material being tested and a comparative reading is obtained by measuring the diameter of the impression made thereby. The Rockwell testing device provides a predetermined pressure to a diamond point, the degree of penetration of which is registered on a dial which provides a hardness number reading. The latter type of device is more universally used at the present time since a direct dial reading is obtained which eliminates the personal element which is present in the Scleroscope and the Brinell type of instruments.

The present device operates somewhat as a Scleroscope type of testing device but is similar to the Rockwell type of testing machine in that a positive reading is obtained by the striking element which is maintained at its maximum point of rebound, thereby eliminating the personal equation mentioned hereinabove and providing a positive reading of the hardness of the material which is being tested.

The device embodies a tube having therein a free-floating striking hammer which is of predetermined weight and provided with a ball clutch which is released to permit a free fall of the hammer and which is reset to lock the hammer after it has rebounded to a maximum height. Slots are provided in the wall of the tube in which projections on a sleeve of the ball clutch extend for shifting the sleeve to ball releasing and ball locking positions when the hammer is moved to the latched and striking ends thereof, respectively.

At the top of the sleeve a latch mechanism is employed for engaging and supporting the hammer a predetermined set distance from the striking end. A button, mounted in the end of the latching mechanism having its center aligned with the axis of the tube, releases the latch when the button is pressed downwardly. This assures the application of a downward pressure to the instrument against the material being tested to permit the hammer to strike a like blow on all materials tested. Graduated scales are provided on the opposite sides of the slots in the body of the device which are comparative to each other and preferably representing the Scleroscope, Rockwell, or Brinell scales so that reading conforming thereto will be obtained.

Accordingly, the main objects of the invention are: to provide a portable type of testing instrument which provides positive readings in the Scleroscope, Brinell or Rockwell scales; to provide a testing device having a hammer on which a shiftable clutch is mounted which permits a free fall of the hammer when shifted to one position and which locks the hammer against a downward movement after a maximum rebound height has been reached when shifted to its other position; to provide a latch for a hammer which is retained at a predetermined distance from the striking end of the instrument and which is actuated by a downward force applied to a button on the axis of the device to assure a satisfactory engagement with the material being tested when the hammer is released; and in general to provide a portable type of hardness testing instrument which is simple in construction, positive in operation, and economical of manufacture.

Other objects and features of novelty of the invention will be specifically pointed out or will become apparent when referring, for a better understanding of the invention, to the following description taken in conjunction with the accompanying drawing, wherein Figure 1 is a broken view in elevation of a hardness testing device embodying features of this invention;

Fig. 2 is a sectional view of the upper portion of the device illustrated in Fig. 1, taken on the line 2—2 thereof, with the hammer in raised, latched position.

Fig. 3 is a sectional view of the lower portion of the structure illustrated in Fig. 1, taken on the line 3—3 thereof, with the hammer in its lowermost or striking position;

Fig. 4 is a sectional view of the structure illustrated in Fig. 2, taken on the line 4—4 thereof, with the hammer latched in rebounded position;

Fig. 5 is a sectional view of the structure illustrated in Fig. 3, taken on the line 5—5 thereof, and Fig. 6 is a sectional view of the structure illustrated in Fig. 5, taken on the line 6—6 thereof.

The hardness testing device illustrated in the figures comprises a tubular body portion 10 having an accurately finished bore 11 and oppositely disposed flat faces 12 and 13 on the exterior surface divided by diametrically disposed slots 14. A hammer 15 is disposed within the bore 11 comprising a threaded stem 16 having a ball 17 secured on the end thereof by a cap 18 which is threaded upon the stem 16. The cap is opened at the end to permit the ball to project beyond the end surface thereof. The upper end of the stem 16 has a threaded shank 19 thereon upon which a head 21 is threaded. The head has a recess 22 beneath an indicating portion 23 which has a sliding fit with the internal bore 11. A recess 24 in the body of the stem 16 provides an inverted frusto-conical section 26 forming a cam lock with the internal surface of the bore 11 by the action of a pair of balls 25 therewith.

For controlling the movement of the balls out of locking position, a sleeve 27 is mounted on the stem 16 having frictional engagement therewith and containing apertures 28 for receiving the balls. A pair of pins 29 projects from the sleeve 27 into the slots 14 in the body element 10. A ring groove 31 in the interior wall of the body portion 10 receives a spring ring 32 which projects into the path of movement of the pins 29 which are engaged thereby to retain the sleeve 27 stationary as the stem is moved by its weight into latched position when the testing device is inverted. In this position the balls 25 are moved to the lower portion of the recess 24 where sufficient clearance prevents them from forming a lock between the truncated conical portion 26 and the internal wall of the bore 11 when dropped. Fig. 2 illustrates the position of the sleeve when moved downwardly into a position which prevents the balls from forming a lock with the internal wall of the bore 11.

When the hammer has moved substantially to the bottom of the bore, the pins 29 engage the bottom of the slots 14 and retain the sleeve against movement as the hammer continues to move, thereby shifting the sleeve upwardly relative to the stem 16 to move the balls into clamping position when the hammer has reached striking position. On the upward travel of the hammer, produced by its rebound from striking the material to be tested, the balls will roll to the bottom of the apertures 28 and will not interfere therewith. However, when the hammer starts to drop, the balls will tend to move upwardly in the apertures 28 thereby forming a lock between the frusto-conical portion 26 of the stem 16 and the internal wall of the bore 11.

Readings may then be taken from the graduations 34 and 35 on both sides of the flat surfaces on the body exterior through the slot 14 therethrough. The head portion 23 of the hammer is provided with an annular slot 36 which is filled with a color pigment to provide a red, white or other color line about the head which is visible through the slots 14. The line indicates the height of rebound of the hammer and hardness readings may be obtained from the graduations 34 or 35 on both sides of the instrument. The scales are preferably comparative, showing the hardness by Scleroscope, Brinell 500 kilogram, Brinell 3000 kilogram and Rockwell readings. The areas on each side of the slots 14 permit the four scales to be readily applied to the instrument.

The upper end of the body element 10 contains a slot 37 in which a block 38 is retained by a knurled cap 39 which is press fitted or otherwise secured thereon. The block 38 contains a slot 41 for a trigger 42 which is pivotally mounted therein by a pin 43 extending through the block. Beneath the pin the slot is enlarged to form an aperture 44 for retaining a spring 45 beneath the trigger. The cap 39 contains a central aperture 46 in which a push button 47 is mounted in position to actuate an end 48 of the trigger to move a detent 49 on its opposite end outwardly of the recess 22 in the head 21 to thereby release the hammer and permit it to drop.

The push button 47 contains an annular flange 51 which prevents it from moving out of the aperture 46 when urged outwardly by a spring 52 which is disposed between the block 38 and the flange 51. A ring groove 53 in the lower portion of the wall of the bore 11 of the body element 10 receives a spring ring 54 for preventing the hammer from passing from the end of the body portion after being inserted therein. A plurality of apertures 54 may be provided through the wall of the body element 10 for permitting a free flow of air therefrom as the hammer is dropped. Diametrically disposed notches 55 may be provided in the end of the body element 10 for centering the instrument on a wire or rod to be tested and also for the purpose of permitting the air to escape ahead of the downward movement of the hammer to prevent its drop from being retarded.

In operation, when the hardness of a piece of material is to be determined, the hardness testing device herein illustrated is first inverted to permit the hammer 15 to fall to the latching end of the device to have the detent 49 ride over the head portion 23 and project within the recess 22. During this movement of the hammer, the pins 29 strike the spring ring 32 and deflect the sleeve 27 on the stem 16 to move it toward the cap 18, as illustrated in Fig. 2. When the device is then inverted to the position herein illustrated, the end of the body element 10 may be placed against the material to be tested, after which the push button 47 is deflected to operate the latch 42 to thereby release the hammer 15 which is free to drop through the bore 11.

As the hammer nears the end of its descent, the pins 29 engage the ends 33 of the slots 14 thereby holding the sleeve 27 as the hammer proceeds to strike the material through the engagement of the ball 17 therewith. As a result of the striking of the material by the hammer with a predetermined force resulting from its fall from a predetermined height, the hammer will rebound. The amount of rebound produced to the hammer will be the same for the same material and will vary as the characteristics of the material being tested vary. As a result, the height of the rebound of the hammer will conform to the characteristics of the material so that a hardness indication will be obtained from the amount of rebound.

In order that a positive reading may be obtained, the cam locking device is employed for immediately locking the hammer just below the maximum height of rebound by the operation of the balls 25 on the frusto-conical portion 26. The locked position of the hammer, as illustrated in Fig. 4, and the amount of drop required to have the cam lock function, which was found to be very small, was taken into consideration when applying the scales 34 and 35 to the flat faces 12 and 13 of the body element 10. As a result, true readings are provided by the position of the hammer after its rebound from the material being tested.

What is claimed is:

1. In a hardness testing device, a tubular body element having slots in the wall disposed in diametrically opposite relation, a hammer within said body element having a striking member on one end thereof which is projectable below the body element and having a surface tapering toward said one end, locking balls on the hammer cooperating with said surface by which the hammer may be locked to the inner wall of the body element, a sleeve carried by the hammer and shiftable thereon for moving the balls to locking and unlocking positions and having projections extending into said slots, means in the slots on the body element for shifting said sleeve and moving the locking balls to operative and inoperative positions whereby the hammer may fall freely in the body element to strike a material to be tested as the sleeve is actuated to shift the balls to locking position to become effective when the hammer attempts to fall after rebound to clamp the hammer in rebounded position.

2. In a hardness testing device, a tubular body element having slots in the wall disposed in diametrically opposite relation, a hammer within said body element having a striking member on one end thereof which is projectable below the body element and having a surface tapering toward said one end, locking balls on the hammer cooperating with said surface by which the hammer may be locked to the inner wall of the body element, a sleeve carried by the hammer and shiftable thereon for moving the balls to locking and unlocking positions and having projections extending into said slots, means in the slots on the body element for shifting said sleeve and moving the locking balls to operative and inoperative positions whereby the hammer may fall freely in the body element to strike a material to be tested as the sleeve is actuated to shift the balls to locking position to become effective when the hammer attempts to fall after rebound to clamp the hammer in rebounded position, latching means on the end of the body element opposite to the striking end containing a latch for engaging and retaining the hammer in raised positions after the device has been inverted, and a push button on the end of the latching means for releasing said latch to permit the free fall of the hammer after the locking mechanism has again been shifted to inoperative position during the latching of the hammer by the latching means.

3. In a hardness indicating device, a tubular body having a hollow interior, a hammer in said body having an end which is projectable from one end of the body and having a surface tapering toward said end, locking balls carried by the hammer and engageable with the interior wall of the body, a sleeve shiftably mounted on the hammer for moving the balls into locked and unlocked positions relative to the tapered surfaces of the hammer and body, and means for moving said sleeve near the end of the upper and lower travel of the hammer.

4. In a hardness indicating device, a tubular body having a hollow interior, a hammer in said body having an end which is projectable from one end of the body and having a surface tapering toward said end, a sleeve carried by the hammer and movable relative thereto, balls engageable with the interior wall of the body and carried by the sleeve to be shiftable thereby relative to the tapered surface of the hammer, means on the body for shifting the sleeve and moving the balls into operative and inoperative positions relative to the tapered surface near each end of the movement of the hammer therein, and latching means on the end of the body opposite to the striking end for maintaining the hammer in raised position.

5. In a hardness indicating device, a tubular body having a hollow interior, a hammer in said body having an end which is projectable from one end of the body and having a surface tapering toward said end, a sleeve carried by the hammer and movable relative thereto, balls engageable with the interior wall of the body and carried by the sleeve to be shiftable thereby relative to the tapered surface of the hammer, means on the body for shifting the sleeve and moving the balls into operative and inoperative positions relative to the tapered surface near each end of the movement of the hammer therein, latching means on the end of the body opposite to the striking end for maintaining the hammer in raised position, and a push button on the end of the latching means for releasing said latch.

WILLIAM F. KLEMM.

REFERENCES CITED

The following references are of record in the file of this patent:

UNITED STATES PATENTS

| Number | Name | Date |
|---|---|---|
| 1,444,606 | Herrmann | Feb. 6, 1923 |
| 1,586,363 | Hall | May 25, 1926 |
| 1,762,639 | Roudie | June 10, 1930 |

FOREIGN PATENTS

| Number | Country | Date |
|---|---|---|
| 375,343 | Germany | May 8, 1923 |
| 33,427 | France | May 2, 1928 |
| | (Addition to Patent 623,985) | |